(12) United States Patent
Scholz et al.

(10) Patent No.: US 8,337,794 B2
(45) Date of Patent: Dec. 25, 2012

(54) SILICONE RUBBER

(75) Inventors: Mario Scholz, Grundau (DE); Helmut Mangold, Rodenbach (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 12/325,916

(22) Filed: Dec. 1, 2008

(65) Prior Publication Data

US 2009/0176922 A1    Jul. 9, 2009

Related U.S. Application Data (63) Continuation of application No. 10/527,681, filed on Mar. 11, 2005, now abandoned.

(30) Foreign Application Priority Data

Sep. 14, 2002 (DE) .................................. 102 42 798

(51) Int. Cl.
C01B 33/12 (2006.01)
C08L 83/00 (2006.01)

(52) U.S. Cl. ................... 423/337; 423/335; 524/588

(58) Field of Classification Search ................ 524/493, 524/860

See application file for complete search history.

(56) References Cited

U.S. PATENT DOCUMENTS

| | | | | |
|---|---|---|---|---|
| 4,659,621 A * | 4/1987 | Finn et al. | ...................... | 428/339 |
| 4,690,967 A * | 9/1987 | LaGarde et al. | ............... | 524/266 |
| 5,004,771 A * | 4/1991 | Feder et al. | .................... | 524/161 |
| 5,061,965 A * | 10/1991 | Ferguson et al. | ............ | 399/325 |
| 5,145,901 A * | 9/1992 | Feder | ............................ | 524/424 |
| 6,252,028 B1 * | 6/2001 | Fehn et al. | ....................... | 528/15 |
| 6,323,262 B1 * | 11/2001 | Achenbach et al. | .......... | 523/343 |
| 6,359,098 B1 * | 3/2002 | Fehn et al. | ....................... | 528/15 |
| 6,555,237 B1 * | 4/2003 | Chen et al. | ...................... | 428/447 |
| 6,759,118 B2 * | 7/2004 | Finn et al. | ....................... | 428/323 |
| 6,770,700 B2 * | 8/2004 | Mueller et al. | ................ | 524/494 |
| 6,855,635 B2 * | 2/2005 | Schumacher et al. | ........ | 438/692 |
| 2001/0047049 A1 * | 11/2001 | Heisler et al. | ................. | 524/492 |
| 2001/0049414 A1 * | 12/2001 | Muller et al. | .................. | 524/588 |
| 2002/0168312 A1 | 11/2002 | Mangold et al. | | |

OTHER PUBLICATIONS

Encyclopedia of Polymer Science and Engineering, vol. 15, 1989, pp. 204-308, plus two cover pages.*

* cited by examiner

Primary Examiner — Robert S Loewe
(74) Attorney, Agent, or Firm — Smith, Gambrell & Russell, LLP

(57) ABSTRACT

Silicone rubber containing a fumed silica doped with potassium by means of aerosol.

2 Claims, 5 Drawing Sheets

SILICONE RUBBER

CROSS REFERENCE TO RELATED APPLICATION

This application is a continuation of Ser. No. 10/527,681, filed Mar. 11, 2005 now abandoned which claims priority of DE 102 42 798.4 filed Sep. 14, 2002 which is being incorporated in its entirety herein by reference.

FIELD OF THE INVENTION

The invention relates to silicone rubber, to a process for its production and to its use.

DESCRIPTION OF RELATED ART

It is known to use hydrophobic fumed silica as filler in silicone rubber (DE 199 43 666 A1).

U.S. Pat. No. 6,331,588 describes LSR silicone rubbers which contain fumed silicas as filler. In order to avoid the undesirable influence of the silanol groups on the mechanical properties of the silicone rubber, it is necessary according to U.S. Pat. No. 6,331,588 to render the surface of the fumed silica hydrophobic.

According to the prior art, in the case of LSR (liquid silicone rubber), either a hydrophilic silica is rendered hydrophobic in situ and at the same time exposed to very high shear forces so that the viscosity and the flow limit can be lowered, or a silica that has already been rendered hydrophobic is exposed to high shear forces for the same reason.

BRIEF SUMMARY OF INVENTION

The invention provides a silicone rubber which is characterised in that it contains as filler a fumed silica doped with potassium by means of aerosol.

In an embodiment of the invention, the filler may be an oxide which has been prepared pyrogenically by means of flame oxidation or, preferably, flame hydrolysis and which has been doped with from 0.000001 to 40 wt. % potassium, the BET surface area of the doped oxide being from 10 to 1000 m2/g and the DBP absorption of the fumed oxide being undetectable or being less than 85% of the normal value for such fumed silica.

In a preferred embodiment of the invention, the amount of potassium used for the doping may be in the range from 1 to 20,000 (twenty thousand) ppm.

DETAILED DESCRIPTION OF INVENTION

The fumed silicon dioxide (silica) doped with potassium by means of aerosol is known from DE 196 505 00 A1.

If that low-structured fumed silicon dioxide is incorporated into silicone rubber, totally novel properties of the silicone rubber result.

In a preferred embodiment of the invention, the silicone rubber may be a LSR silicone rubber. In a further preferred embodiment of the invention, the silicone rubber may be a HTV silicone rubber.

The filler can be prepared according to DE 196 50 500. On account of the added potassium, the morphology of the fumed silicon dioxide is changed, so that a lower degree of intergrowth of the primary particles and hence a lower structure results.

For elastomer applications there are used polydimethylsiloxanes which have molecular weights of from 400,000 to 600,000 and which are prepared with the addition of regulators, such as hexamethyl- or divinyltetramethyl-disiloxane, and carry corresponding end groups. In order to improve the vulcanisation behaviour and also the tear-growth resistance, small amounts (<1%) of vinyl groups are often incorporated into the main chain as substituents by the addition of vinylmethyldichlorosilane to the reaction mixture (VMQ).

HTV silicone rubber is understood to mean water-clear, highly viscous self-deliquescing silicone polymers which have a viscosity of from 15 to 30 kPas with a chain length of about 10,000 SiO units. As further constituents of the silicone rubber there are used crosslinkers, fillers, catalysts, colouring pigments, anti-adhesives, plasticisers, adhesion promoters.

In hot vulcanisation, the processing temperatures are usually in the range of about from 140 to 230° C., whereas cold vulcanisation is carried out at temperatures of from 20 to 70° C. In vulcanisation, a distinction is made between peroxidic crosslinking, addition crosslinking and condensation crosslinking.

Peroxidic crosslinking takes place via a radical reaction mechanism. The peroxides decompose under the action of temperature into radicals which attach to the vinyl or methyl groups of the polysiloxanes and produce new radicals which are then bonded to other polysiloxane chains and thus result in spatial crosslinking. The recombination of two radicals or the increasing restriction on chain movability as the degree of crosslinking increases leads to termination of the crosslinking reaction.

In peroxidic crosslinking, different peroxides are used depending on the processing method (e.g. extrusion, injection moulding, compression moulding) in order to match the rate of crosslinking to the process-specific processing conditions. For example, very high rates of crosslinking are required for extrusion, and low rates of crosslinking are necessary in the production of moulded articles by injection moulding or compression moulding, in order to avoid the onset of crosslinking during filling of the cavity.

The nature of the peroxide used also has an effect on the structure and hence on the physical properties of the vulcanate. Diaroyl peroxides (bis(2,4-dichlorobenzoyl)peroxide, dibenzoyl peroxide) crosslink both vinyl and methyl groups. With dialkyl peroxides (dicumyl peroxide, 2,5-(di-tert-butylperoxy)-2,5-dimethylhexane), on the other hand, vinyl-specific crosslinking takes place almost exclusively.

The Shore hardness of the vulcanate can be controlled to a certain degree by the amount of peroxide in the mixture. As the amount of peroxide increases, the Shore hardness increases owing to a higher density of crosslinking sites. However, too large an amount of peroxide leads to a fall in ultimate elongation, tensile strength and tear-growth resistance. Depending on the application, peroxidic crosslinking requires after-tempering of the vulcanates in order to reduce the permanent set and remove the cleavage products of the peroxides. In addition to the aromatic odour which typically occurs especially with dicumyl peroxide, the cleavage products may also lead to impairment of the physical properties of the vulcanates (e.g. reversion in the case of acid cleavage products).

In the case of fillers, a distinction is to be made between reinforcing and non-reinforcing fillers.

Non-reinforcing fillers are characterised by extremely weak interactions with the silicone polymer. They include chalk, quartz powder, diatomaceous earth, mica, kaolin, Al(OH)3 and Fe2O3. The particle diameters are of the order of magnitude of 0.1 µm. Their function is to raise the viscosity of the compounds in the non-vulcanised state and to increase the Shore hardness and the modulus of elasticity of the vulcanised rubbers. In the case of surface-treated fillers, improvements in tear strength can also be achieved.

Reinforcing fillers are especially highly disperse silicas having a surface area of >125 m2/g. The reinforcing action is attributable to the bond between the filler and the silicone polymer. Such bonds are formed between the silanol groups at the surface of the silicas (from 3 to 4.5 SiOH groups/nm2) and the silanol groups of the α-ω dihydroxypolydimethylsiloxanes via hydrogen bridge bonds to the oxygen of the siloxane chain. The consequence of those filler-polymer interactions are increases in viscosity and changes in the glass transition temperature and the crystallisation behaviour. On the other hand, polymer-filler bonds bring about an improvement in the mechanical properties, but may also result in premature crepe hardening of the rubbers.

Talcum occupies a middle position between reinforcing and non-reinforcing fillers. Fillers are additionally used for particular effects. These include iron oxide, zirconium oxide or barium zirconate for increasing heat stability.

Silicone rubbers may contain catalysts, crosslinkers, colouring pigments, anti-adhesives, plasticisers and adhesion promoters as further constituents.

Plasticisers are required especially in order to establish a low modulus of elasticity. Internal adhesion promoters are based on functional silanes, which are able to interact on the one hand with the substrate and on the other hand with the crosslinking silicone polymer (use principally in RTV-1 rubbers).

Low molecular weight or monomeric silanol-rich compounds (e.g. diphenylsilanediol, H2O) counteract premature crepe hardening. They prevent the silicone polymers from interacting too strongly with the silanol groups of the filler, by reacting more rapidly with the filler. A corresponding effect can also be achieved by partially charging the filler with trimethylsilyl groups (treatment of the filler with methylsilanes).

It is also possible to modify the siloxane polymer chemically (phenyl polymers, boron-containing polymers) or to blend it with organic polymers (butadiene-styrene copolymers).

Liquid silicone rubber (LSR) is virtually identical to HTV in its molecular structure, but its mean molecule chain length is lower by a factor of 6 and its viscosity is therefore lower by a factor of 1000 (20-40 Pas). The processor has available two components (A and B) in equal amounts, which already contain the fillers, vulcanising agents and optionally other additives.

As fillers there are used the same silicas and additives as in HTV mixtures. Because of the low viscosity of the starting polymer, particularly intensive incorporation and mixing in specially developed mixing units are required for homogeneous distribution. In order to facilitate incorporation of the fillers and to avoid crepe hardening, the silica is rendered fully hydrophobic—mostly in situ during the mixing operation and by means of hexamethyldisilazane (HMDS, also HMDZ).

The vulcanisation of LSR mixtures is carried out by hydrosilylation, i.e. by addition of methyl hydrogen siloxanes (having at least 3 SiH groups in the molecule) to the vinyl group of the polymer with catalysis by ppm amounts of Pt(O) complexes, the crosslinker and the catalyst being in the separate components when supplied. Special inhibitors, e.g. 1-ethynyl-1-cyclohexanol, prevent the premature onset of vulcanisation after mixing of the components and establish a dropping time of about 3 days at room temperature. The conditions can be adjusted in a considerable range via the concentration of platinum and inhibitor.

LSR mixtures are increasingly being used for the production of electrically conductive silicone rubber articles, because addition crosslinking, in contrast to peroxide vulcanisation, which is conventional in the case of HTV, is not disturbed by furnace blacks (in HTV mixtures, acetylene black is preferably used). Conductive furnace blacks are also easier to incorporate and distribute than graphite or metal powders, with silver being preferred.

The silicone rubber according to the invention has the following advantages:

Tests in LSR (liquid silicone rubber) show that the doped oxides of Examples 1 to 4 according to the invention (VP's 3739, 3650, 3740, 3744) exhibit markedly lower viscosities and flow limits in the liquid silicone as compared with doped aerosils (fumed silicas) of equal or similar surface area. The markedly lower flow limits in particular are advantageous, because very good flow behaviour is desirable when processing liquid silicone rubber.

Using the hydrophilic potassium-doped oxides it is possible according to the invention to use materials which, owing to their low structure, already have extremely low viscosities and flow limits and hence do not have to be exposed to high shear forces during production. The saving of energy costs and material costs is advantageous for the user. In addition, the silicone rubbers according to the invention exhibit improved optical properties in the form of high transparency.

In the case of HTV silicone rubber, the oxides doped with potassium according to the invention also exhibit advantages in respect of rheological properties. The Williams plasticity, a measure of viscosity, is markedly lower, especially after storage, than that of undoped fumed silicas of comparable surface area. That effect is even more pronounced in the case of prolonged storage. Over the entire test period of 22 days, the Williams plasticities of the doped oxides (VP 3740, VP 3744) according to the invention are markedly lower than those of the hydrophilic comparison products (A 200, A 300). It is also surprising that, even when comparing VP 3740 with R 104, the Williams plasticities achieve a similar level. In the case of VP 3744, those values lie between hydrophilic and hydrophobic AEROSIL.

The increase in viscosity during storage is referred to as crepe hardening. For the processor, it is very important that this increase should be as small as possible, so that the silicone compounds remain processable even after storage or transportation and do not require expensive softening by rolling. The potassium-doped oxides exhibit marked advantages in this respect compared with hydrophilic undoped fumed silicas.

EXAMPLES

Production of low-structured powders. A burner arrangement as described in DE 196 50 500 is used.

Example 1

Doping with an Aerosol Prepared from a Solution of Potassium Chloride (3739)

4.44 kg/h of SiCl4 are vaporised at about 130° C. and transferred to the central pipe of the burner according to DE 196 50 500. In addition, 3.25 Nm3/h of hydrogen and 5.25 Nm3/h x1: air and 0.55 Nm3/h of oxygen are fed into that pipe. The gas mixture flows out of the inner burner nozzle and burns in the combustion chamber of a water-cooled flame tube. 0.5 Nm3/h of (jacket) hydrogen and 0.2 Nm3/h of nitrogen are additionally fed into the jacket nozzle, which surrounds the central nozzle, in order to avoid caking.

40 Nm3/h of air are additionally drawn into the flame tube, which is under a slightly reduced pressure, from the surroundings.

The second gas component, which is introduced into the axial pipe, consists of an aerosol prepared from a 2.5% aqueous KCl-salt solution. A binary nozzle which yields an atomisation output of 247 g/h aerosol is used as the aerosol generator. The aqueous salt aerosol is guided, by means of 3.5 Nm3/h of carrier air, through externally heated pipes and leaves the inner nozzle at a discharge temperature of 153° C. The potassium-salt-containing aerosol so introduced is brought into the flame and changes accordingly the properties of the fumed silica that is produced.

After the flame hydrolysis, the reaction gases and the resulting fumed silica doped with potassium (oxide) are drawn through a cooling system by application of a reduced pressure, and the particle gas stream is thereby cooled to about 100 to 160° C. In a filter or cyclone, the solid is separated from the waste gas stream.

The resulting fumed silica doped with potassium oxide is obtained in the form of a finely divided white powder. In a further step, any adhering hydrochloric acid residues are removed from the doped silica at temperatures of from 400 to 700° C. by treatment with air containing water vapour.

The BET surface area of the fumed silica is 107 m2/g. The content of analytically determined potassium oxide is 0.18 wt. %.

The preparation conditions are summarised in Table 1, the flame parameters are given in Table 2, and further analytical data of the silica so obtained are shown in Table 3.

Example 2

Doping with an Aerosol Prepared from a Solution of Potassium Chloride (3650)

The procedure is as indicated under Example 1:
4.44 kg/h of SiCl4 are vaporised at about 130° C. and transferred to the central pipe of the burner according to DE 196 50 500. In addition, 4.7 Nm3/h of hydrogen and 5.7 Nm3/h of air and 1.15 Nm3/h of oxygen are fed into that pipe. The gas mixture flows out of the inner burner nozzle and burns in the combustion chamber of a water-cooled flame tube. 0.5 Nm3/h of (jacket) hydrogen and 0.2 Nm3/h of nitrogen are additionally fed into the jacket nozzle, which surrounds the central nozzle, in order to avoid caking.

25 Nm3/h of air are additionally drawn into the flame tube, which is under a slightly reduced pressure, from the surroundings.

The second gas component, which is introduced into the axial pipe, consists of an aerosol prepared from a 9% aqueous KCl salt solution. A binary nozzle which yields an atomisation output of 197 g/h aerosol is used as the aerosol generator. The aqueous salt aerosol is guided, by means of 4 Nm3/h of carrier air, through externally heated pipes and leaves the inner nozzle at a discharge temperature of 123° C. The potassium-salt-containing aerosol so introduced changes accordingly the properties of the fumed silica that is produced.

After the flame hydrolysis, the reaction gases and the resulting doped fumed silica are drawn through a cooling system by application of a reduced pressure, and the particle gas stream is thereby cooled to about 100 to 160° C. In a filter or cyclone, the solid is separated from the waste gas stream.

The resulting fumed silica doped with potassium (oxide) is obtained in the form of a finely divided white powder. In a further step, any adhering hydrochloric acid residues are removed from the silica at temperatures of from 400 to 700° C. by treatment with air containing water vapour.

The BET surface area of the fumed silica is 127 m2/g.

The preparation conditions are summarised in Table 1, the flame parameters are given in Table 2, and further analytical data of the silica so obtained are shown in Table 3.

Example 3

Doping with an aerosol prepared from a solution of potassium chloride (3740) 4.44 kg/h of SiCl4 are vaporised at about 130° C. and transferred to the central pipe of the burner according to DE 196 50 500. In addition, 2.5 Nm3/h of hydrogen and 7 Nm3/h of oxygen are fed into that pipe. The gas mixture flows out of the inner burner nozzle and burns in the combustion chamber of a water-cooled flame tube. 0.3 Nm3/h of (jacket) hydrogen and 0.2 Nm3/h of nitrogen are additionally fed into the jacket nozzle, which surrounds the central nozzle, in order to avoid caking.

45 Nm3/h of air are additionally drawn into the flame tube, which is under a slightly reduced pressure, from the surroundings.

The second gas component, which is introduced into the axial pipe, consists of an aerosol prepared from a 2.48% aqueous KCl salt solution. A binary nozzle which yields an atomisation output of 204 g/h aerosol is used as the aerosol generator. The aqueous salt aerosol is guided, by means of 3.5 Nm3/h of carrier air, through externally heated pipes and leaves the inner nozzle at a discharge temperature of 160° C. The potassium-salt-containing aerosol so introduced changes accordingly the properties of the fumed silica that is produced.

After the flame hydrolysis, the reaction gases and the resulting fumed silica doped with potassium (oxide) are drawn through a cooling system by application of a reduced pressure, and the particle gas stream is thereby cooled to about 100 to 160° C. In a filter or cyclone, the solid is separated from the waste gas stream.

The resulting fumed silica doped with potassium (oxide) is obtained in the form of a finely divided white powder. In a further step, any adhering hydrochloric acid residues are removed from the silica at temperatures of from 400 to 700° C. by treatment with air containing water vapour.

The BET surface area of the fumed silica is 208 m2/g. The content of analytically determined potassium oxide is 0.18 wt. %.

The preparation conditions are summarised in Table 1, the flame parameters are given in Table 2, and further analytical data of the silica so obtained are shown in Table 3.

Example 4

Doping with an Aerosol Prepared from a Solution of Potassium Chloride (VP 3744)

4.44 kg/h of SiCl4 are vaporised at about 130° C. and transferred to the central pipe of the burner of known construction according to DE 196 50 500. In addition, 2.0 Nm3/h of hydrogen and 6.7 Nm3/h of air are fed into that pipe. The gas mixture flows out of the inner burner nozzle and burns in the combustion chamber of a water-cooled flame tube. 0.3 Nm3/h of (jacket) hydrogen and 0.2 Nm3/h of nitrogen are additionally fed into the jacket nozzle, which surrounds the central nozzle, in order to avoid caking.

35 Nm3/h of air are additionally drawn into the flame tube, which is under a slightly reduced pressure, from the surroundings. The second gas component, which is introduced into the axial pipe, consists of an aerosol prepared from a 2.48% aqueous KCl salt solution. A binary nozzle which yields an atomisation output of 246 g/h aerosol is used as the aerosol generator. The aqueous salt aerosol is guided, by means of 3.5 Nm3/h of carrier air, through externally heated pipes and leaves the inner nozzle at a discharge temperature of 160° C. The potassium-salt-containing aerosol so introduced is brought into the flame and changes accordingly the properties of the fumed silica that is produced.

After the flame hydrolysis, the reaction gases and the resulting fumed silica doped with potassium (oxide) are drawn through a cooling system by application of a reduced pressure, and the particle gas stream is thereby cooled to about 100 to 160° C. In a filter or cyclone, the solid is separated from the waste gas stream.

The resulting fumed silica doped with potassium (oxide) is obtained in the form of a finely divided white powder. In a further step, any adhering hydrochloric acid residues are removed from the doped silica at temperatures of from 400 to 700° C. by treatment with air containing water vapour.

The BET surface area of the fumed silica is 324 m2/g. The content of analytically determined potassium oxide is 0.18 wt. %.

The preparation conditions are summarised in Table 1, the flame parameters are given in Table 2, and further analytical data of the silica so obtained are shown in Table 3.

TABLE 2

Flame parameters in the preparation of doped fumed silica

| No. | Gamma core [—] | Lambda core [—] | $vk_{norm}$ [m/sec] |
|---|---|---|---|
| 1 | 2.77 | 1.01 | 20.8 |
| 2 | 4.00 | 1.00 | 25.9 |
| 3 | 2.13 | 1.17 | 21.6 |
| 4 | 1.71 | 1.40 | 20.0 |

Legend:
Gamma core = hydrogen ratio in the central pipe;
Lambda core = oxygen ratio in the central pipe; for the precise calculation and definition of gamma and lambda, see EP 0 855 368;
$vk_{norm}$ = discharge speed under standard conditions (273 K, 1 atm).

TABLE 3

Analytical data of the samples obtained according to Examples 1 to 4

| No. | BET [m²/g] | pH 4% aqueous dispersion [—] | Potassium content as $K_2O$ [wt. %] | DBP at 16 g weighed amount in [g/100 g] | Bulk density [g/l] | Tamped density [g/l] |
|---|---|---|---|---|---|---|
| 1 | 107 | 7.07 | 0.18 | n.e.-p. | 24 | 32 |
| 2 | 127 | 7.71 | 0.316 | n.e.-p. | 31 | 42 |
| 3 | 208 | 6.66 | 0.15 | 234 | 19 | 25 |
| 4 | 324 | 6.35 | 0.18 | 305 | 17 | 22 |

Legend:
pH 4% sus. = pH value of the 4% aqueous suspension;
DBP = dibutyl phthalate absorption;
n.e.-p. = device does not detect an end-point.

Low Structure:

A measure of the degree of structuring of a fumed silica is the dibutyl phthalate absorption (DBP). The smaller the DBP number, the lower the structuring (i.e. the degree of intergrowth) of the silica, i.e. of the primary particles. However, because the DBP absorption itself is greatly dependent on the specific surface area (BET), the DBP must always be given in conjunction with the specific surface area.

If the measuring device does not detect an end-point, the structure can be assumed to be very low (DBP values markedly below 100 wt. %).

Normal value: A graph showing the relationship between DBP and BET for aerosil of "normal" structure is given in the series of documents Pigment No. 11 from Degussa AG (page 30). That graph is to be defined as the "normal value" for fumed silica.

TABLE 1

Experimental conditions in the preparation of doped fumed silica

| No. | SiCl₄ kg/h | Primary air Nm³/h | O₂ add. Nm³/h | H₂ core Nm³/h | H₂ jacket Nm³/h | N₂ jacket Nm³/h | Gas temp. ° C. | Potassium salt solution KCl-wt. % | Aerosol amount g/h | Air aeros. Nm³/h | BET m²/g |
|---|---|---|---|---|---|---|---|---|---|---|---|
| 1 | 4.44 | 5.25 | 0.55 | 3.25 | 0.5 | 0.2 | 153 | 2.5 | 247 | 3.5 | 107 |
| 2 | 4.44 | 5.7 | 1.15 | 4.7 | 0.5 | 0.2 | 123 | 9 | 195 | 4 | 127 |
| 3 | 4.44 | 7 | 0 | 2.5 | 0.3 | 0.2 | 160 | 2.48 | 204 | 3.5 | 208 |
| 4 | 4.44 | 6.7 | 0 | 2.0 | 0.3 | 0.2 | 139 | 2.48 | 246 | 3.5 | 324 |

Legend:
Primary air = amount of air in the central pipe;
H₂ core = hydrogen in the central pipe;
Gas temp. = gas temperature at the nozzle of the central pipe;
Aerosol amount = mass flow of the salt solution converted to aerosol form;
Air aerosol = carrier gas amount (air) of the aerosol Accordingly, for Examples 1 and 2 of this invention, a DBP absorption of about 270 wt. % would be expected according to the graph given therein, but no end-point is detected, which indicates very low DBP values (markedly lower than 100 wt. %).

Testing of the Potassium-Doped Fumed Silicas in Silicone Rubber

TABLE 4

Analytical data

| Batch no. | BET surface area [m²/g] | pH value | K₂O content [wt. %] | Tamped density [g/l] | DBP absorption [wt. %] | Drying loss [%] |
|---|---|---|---|---|---|---|
| Ex. 1 VP 3739 | 107 | 7.07 | 0.18 | 32 | — | 1.1 |
| Ex. 2 VP 3650 | 127 | 7.71 | 0.316 | 42 | — | 1.7 |
| Ex. 3 VP 3740 | 208 | 6.66 | 0.15 | 25 | 234 | 1.4 |
| Ex. 4 VP 3744 | 324 | 6.35 | 0.18 | 22 | 305 | 2.5 |

The products from Table 4 are tested in various silicone formulations (HTV, LSR). As comparison material there are used standard types of aerosil having a comparable surface area (known from Ullmann's Encyclopädie der technischen Chemie, Volume 21 (4th edition), page 462 et seq. (1982).

HTV Silicone Rubber

Compounds containing 40 parts of silica and 6 parts of VHM (processing aid) are prepared on a twin roller according to a standard formulation. After 7 days, the mixtures are crosslinked with DCLBP peroxide.

The mechanical properties of the two potassium-doped samples according to Example 3 (VP 3740) and according to Example 4 (VP 3744) are slightly poorer than those of the comparison samples (Table 5).

TABLE 5

Mechanical properties of the vulcanates and rheology of the compound

| Product | Tensile strength [N/mm²] | Ultimate elongation [%] | Tear-growth resistance [N/mm] | Hardness [Shore A] | Rebound resilience [%] | Williams 0 d/7 d |
|---|---|---|---|---|---|---|
| (VP 3740) Ex. 3 | 7.4 | 370 | 7.9 | 52 | 47 | 457/191 |
| Aerosil 200 | 8.5 | 470 | 9.8 | 56 | 48 | 830/339 |
| (VP 3744) Ex. 4 | 8.6 | 445 | 9.9 | 60 | 48 | 820/233 |
| Aerosil 300 | 9.0 | 455 | 12.5 | 64 | 52 | 864/546 |

The Williams plasticity of the compounds is determined after incorporation and after 7 days' storage (Table 5). The compound becomes softer owing to the wetting of the silica which takes place during the storage period. With prolonged storage, crepe hardening of the compound occurs, and the Williams plasticity increases again.

Figure 1:
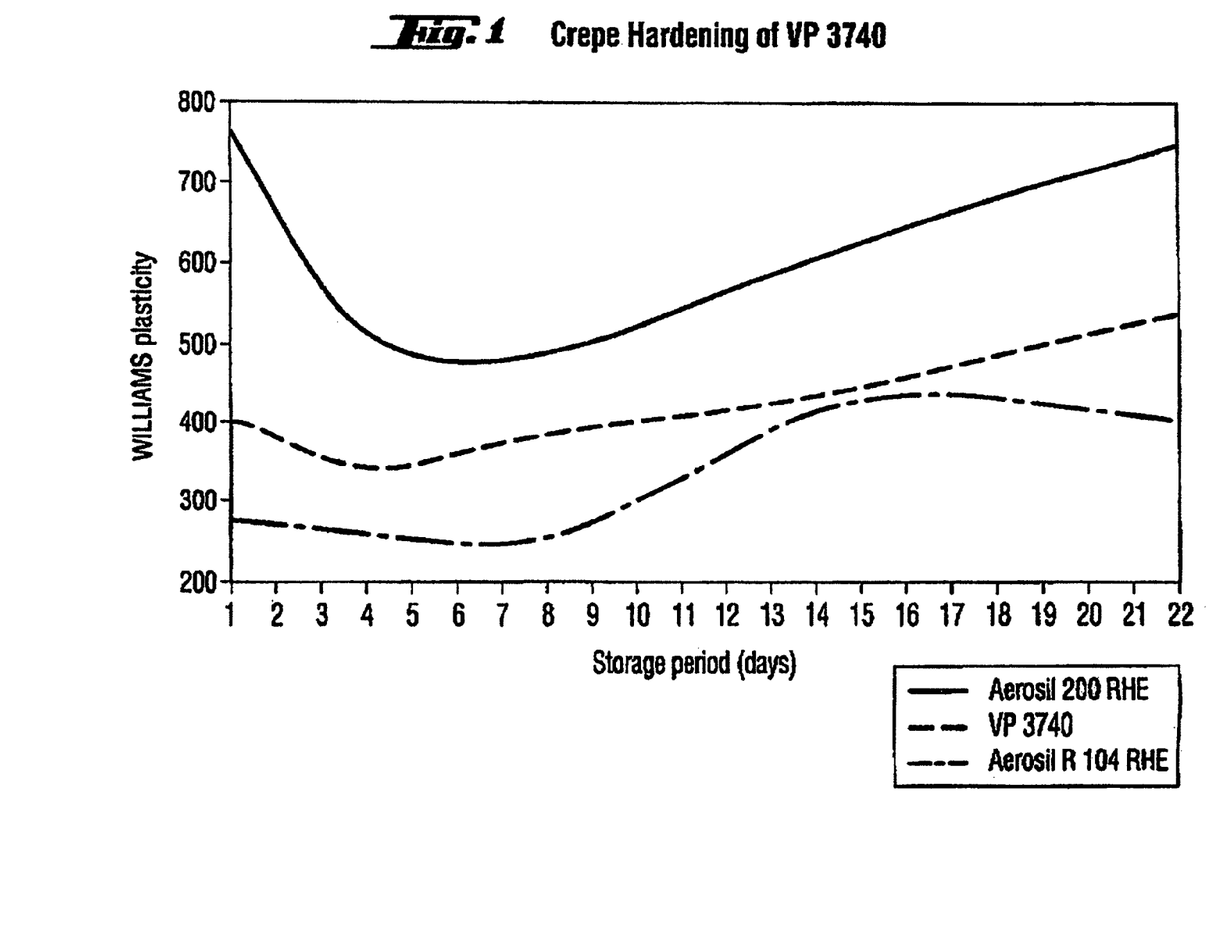
FIG. 1 shows the progression of Williams plasticity—VP3740 (Example 3) is compared with undoped Aerosil® 200 and hydrophilic Aerosil® R104.

In the case of a normal hydrophilic pyrogenically prepared silicon dioxide (Aerosil 200), the Williams plasticity falls markedly after a storage period of 7 days and then rises again sharply. By comparison, the product according to Example 3 (VP 3740) exhibits a markedly lower initial plasticity, which falls further after 7 days. As storage continues, the plasticity rises again here too, but to a lesser degree than in the case of the undoped comparison material. The progression of the plasticity curve of the product according to Example 3 (VP 3740) can be compared—at least in the initial region—not with that of an undoped Aerosil 200 but with that of a hydrophobic Aerosil R 104 (FIG. 1).

Figure 2:
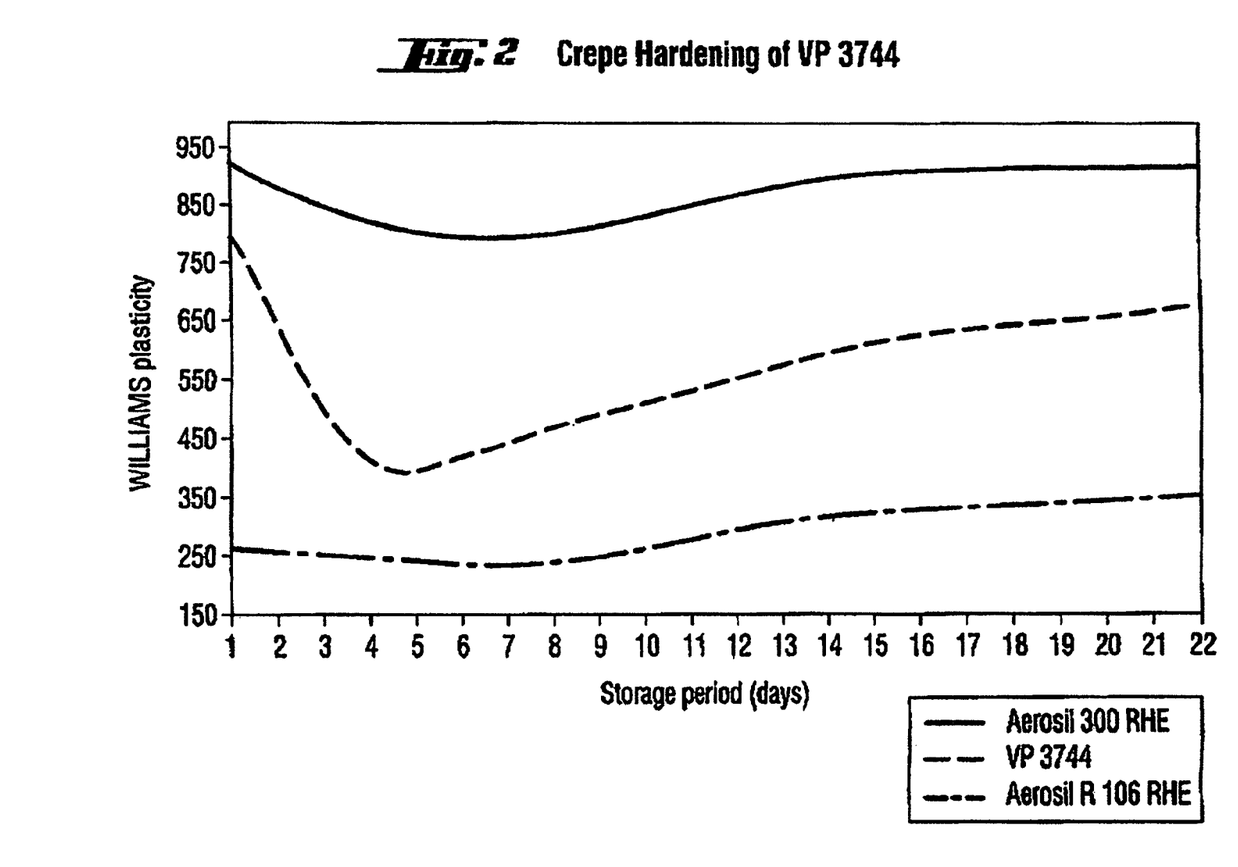
FIG. 2 shows the progression of Williams plasticity—VP3744 (Example 4) is compared with undoped Aerosil® 300 and hydrophilic Aerosil® 106RHE.

In the case of the product according to Example 4 (VP 3744), the Williams plasticity falls markedly after 7 days and then rises again continuously. By contrast, in the case of the undoped Aerosil 300, the Williams plasticity remains at a constantly high level throughout the storage period. The reduction after 7 days is very slight (FIG. 2).

LSR Silicone Rubber

In a planetary dissolver, 10% silica are incorporated at slow speed (50/500 min−1 planetary mixer/dissolver plate) and then dispersed at high speed (100/2000 min−1) for 30 minutes.

After the incorporation, the mixture forms a highly viscous, almost solid mass. After the 30 minutes' dispersion, the viscosity and the flow limit fall markedly. While the product according to Example 3 (VP 3740) and the product according to Example 4 (VP 3744) still exhibit a very high flow limit, the product according to Example 1 (VP 3739) and the product according to Example 2 (VP 3650) form a flowable formulation.

The undoped comparison silicas exhibit a markedly higher thickening action and a pronounced flow limit (Table 6).

TABLE 6

Rheological properties with 10% silica

| Silica | Flow limit [Pa] | Viscosity D = 10 s⁻¹ [Pa · s] |
|---|---|---|
| (VP 3739) Ex. 1 | 0 | 62 |
| Aerosil 90 | 482 | 97 |

TABLE 6-continued

Rheological properties with 10% silica

| Silica | Flow limit [Pa] | Viscosity D = 10 s⁻¹ [Pa · s] |
|---|---|---|
| (VP 3650) Ex. 2 | 0 | 60 |
| Aerosil 130 | 866 | 138.5 |
| (VP 3740) Ex. 3 | 533 | 98 |
| Aerosil 200 | 2176 | 260 |
| (VP 3744) Ex. 4 | 1535 | 286 |
| Aerosil 300 | 2370 | 291 |

The test is then repeated in the same manner using the product according to Example 1 (VP 3739) and according to Example 2 (VP 3650) and the comparison samples Aerosil 90 and Aerosil 130.

When the 30 minute dispersion is complete, the silica content is raised to 15% at slow speed (50/500 min−1). The subsequent dispersion time (100/200 min−1) of 30 minutes is interrupted after 5 minutes and after 15 minutes in order for a sample to be taken. The rheological properties of those samples and at the end of the dispersion time are determined.

Figure 3:
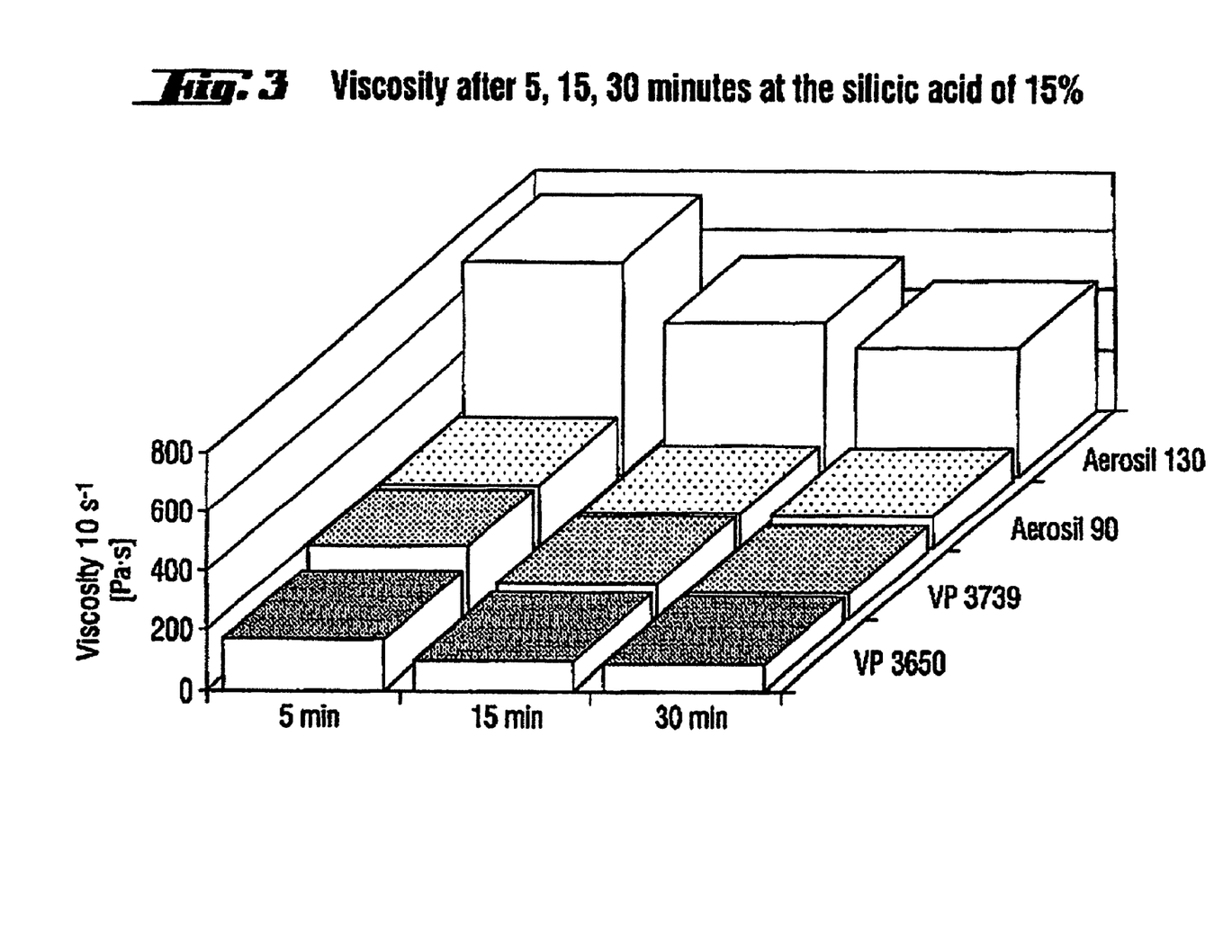
FIG. 3 shows a comparison of rheological properties for dispersions, each comprising one of VP3650 (Example 2), VP3739 (Example 1), Aerosil® 90 and Aerosil® 130.

In the samples according to Example 2 (VP 3650), according to Example 1 (VP 3739) and the comparison sample Aerosil 90, there are only slight differences in the viscosity, which falls markedly during the dispersion time. The sample Aerosil 130, by contrast, has a markedly higher viscosity, the influence of the dispersion time is less too (FIG. 3).

Figure 4:
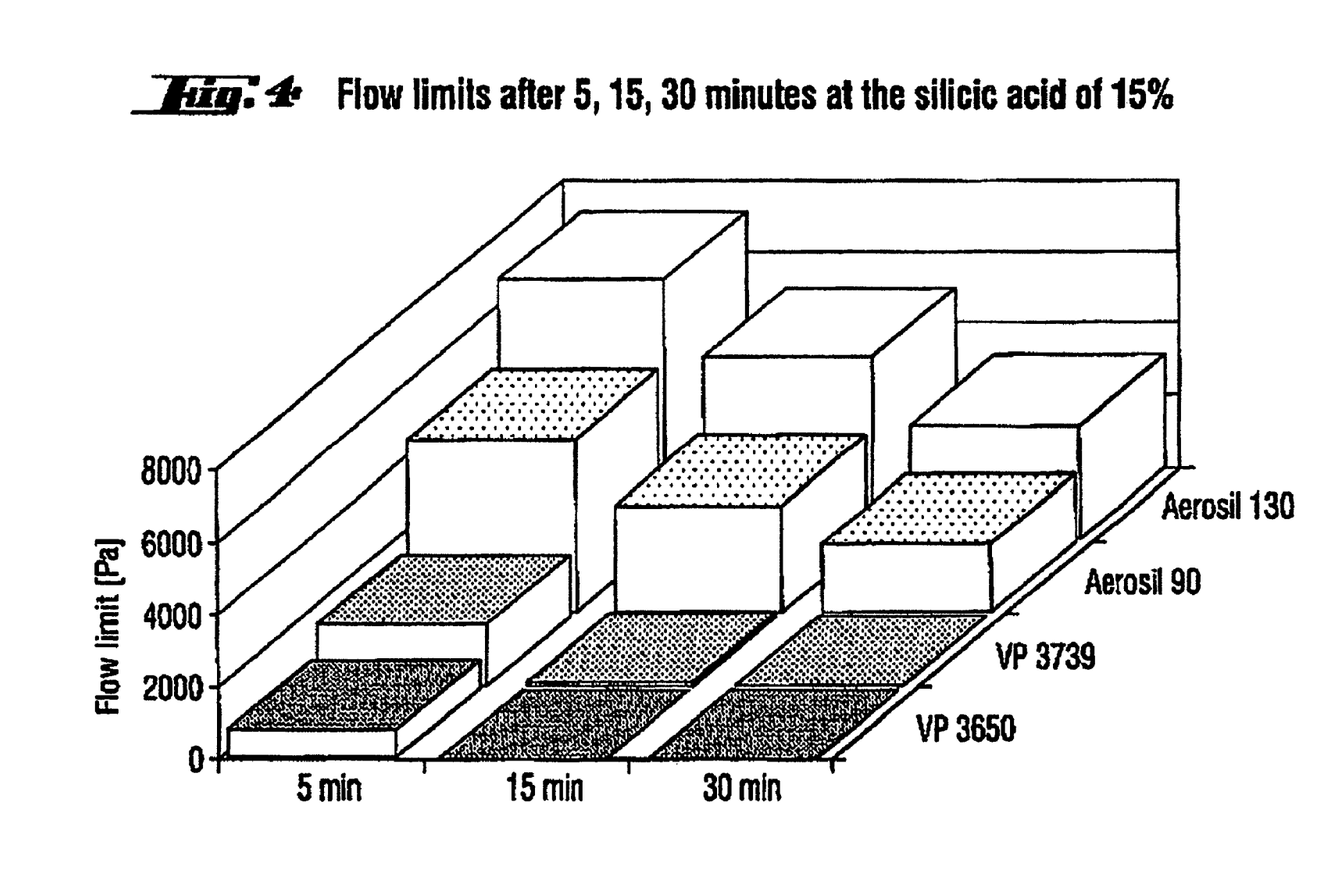
FIG. 4 shows a comparison of flow limits for 15% dispersions, each comprising one of VP3650 (Example 2), VP3739 (Example 1), Aerosil® 90 and Aerosil® 130.

The differences in the flow limit are markedly more pronounced (FIG. 4):

Although the product according to Example 2 (VP 3650) exhibits a pronounced flow limit (=753 Pa) after 5 minutes, a flow limit is no longer detectable after only 15 minutes.

The product according to Example 1 (VP 3739) exhibits a flow limit of 1763 Pa after 5 minutes, which falls to 46 Pa after 15 minutes, and after 30 minutes a flow limit can no longer be detected.

The two comparison samples exhibit a flow limit of 1975 Pa (Aerosil 90) and 3196 Pa (Aerosil 130) even after 30 minutes' dispersion.

The test is then continued by increasing the silica content to 20% at slow speed (50/500 min−1). As in the preceding step, the subsequent dispersion time (100/2000 min−1) of 30 minutes is interrupted after 5 minutes and after 15 minutes in order for a sample to be taken.

TABLE 7a

Rheological properties with 20% silica

| Silica | Flow limit [Pa] | Viscosity D = 10 s$^{-1}$ |
|---|---|---|
| (VP 3739) Ex. 1 | 0 | 192 |
| Aerosil 90 | 1000 | 214 |
| (VP 3650) Ex. 2 | 0 | 177 |
| Aerosil 130 | 3068 | 615 |

At the end of the dispersion time, no flow limit can be detected in the case of the samples according to Example 2 (VP 3650) and according to Example 1 (VP 3739). While the viscosity in the case of Aerosil 90 is only slightly higher than that of the potassium-doped samples, the flow limit is clearly pronounced. Aerosil 130 exhibits a value that is about three times as high for both values.

Figure 5:
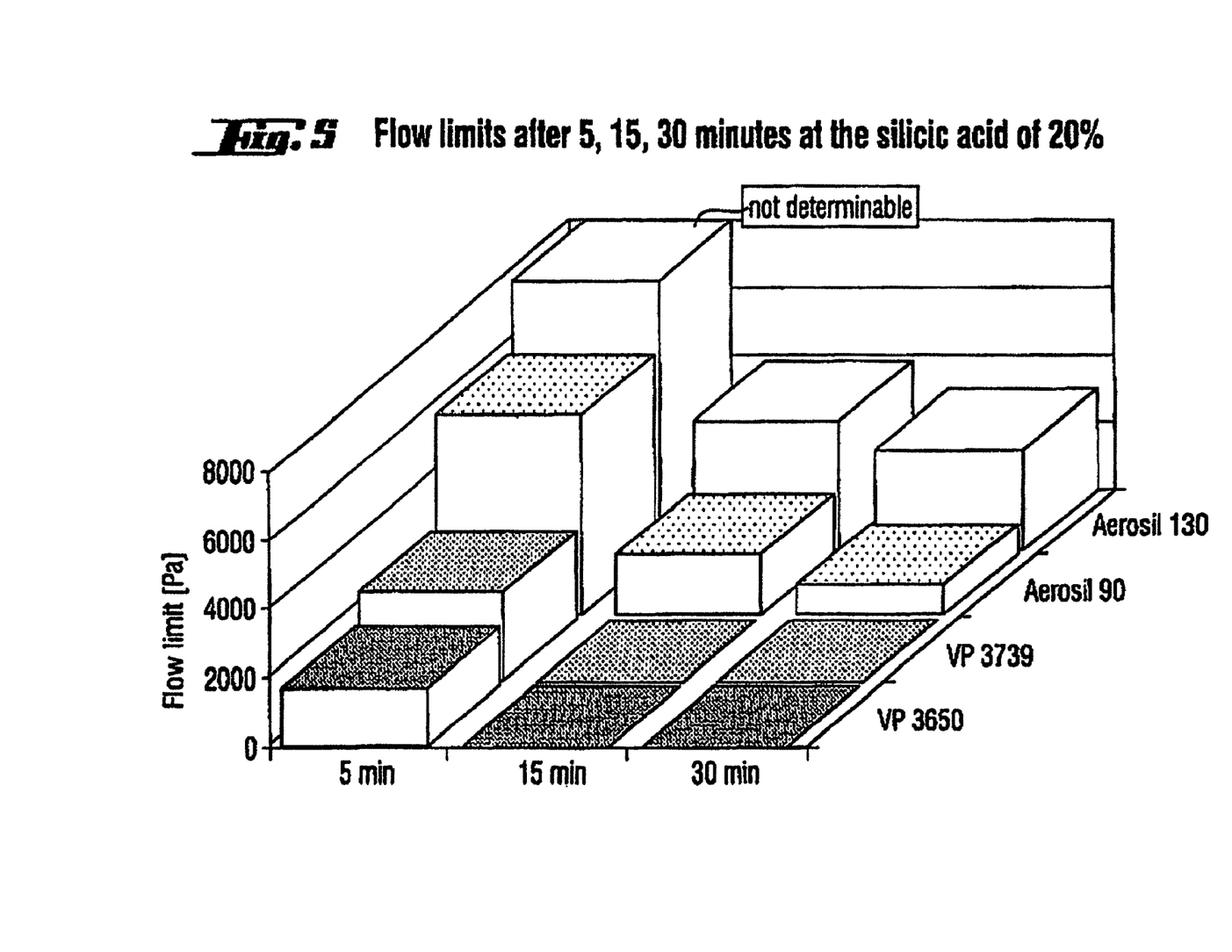
FIG. 5 shows a comparison of flow limits for 20% dispersions, each comprising one of VP3650 (Example 2), VP3739 (Example 1), Aerosil® 190 and Aerosil® 130.

In FIG. 5, the development of the flow limit is clear. The product according to Example 1 (VP 3739) exhibits a markedly higher flow limit after 5 minutes than does the product according to Example 2 (VP 3650); no flow limit is detectable after 15 minutes in the case of both samples. Although in the case of the comparison samples Aerosil 90 and Aerosil 130 the flow limit falls markedly starting from the very high initial values (that of Aerosil 130 can no longer be determined), the flow limit is still very high after the dispersion.

The mixtures are then crosslinked. In the crosslinking, the standard formulation (optimised to a hydrophobic filler with a maximum drying loss of 0.3%) is altered so that the amount of crosslinker (catalyst and inhibitor remain unchanged) was increased according to the higher drying loss of the hydrophilic fillers used.

TABLE 7b

Mechanical and optical properties of the vulcanates with 20% silica

| Silica | Tensile strength [N/mm$^2$] | Ultimate elongation [%] | Tear-growth resistance [N/mm] | Hardness [Shore A] | Rebound resilience [%] | Williams 0 d/7 d |
|---|---|---|---|---|---|---|
| (VP 3739) Ex. 1 | 3.4 | 220 | 2.5 | 41 | 62 | 17.8 |
| Aerosil 90 | 4.1 | 380 | 2.8 | 50 | 60 | 13.8 |
| (VP 3650) Ex. 2 | 2.4 | 290 | 2.0 | 34 | 57 | 21.7 |
| Aerosil 130 | 3.9 | 190 | 4.0 | 52 | 60 | 16.4 |

The two potassium-doped samples exhibit lower values for tensile strength, tear-growth resistance and hardness. However, both samples are markedly more transparent than the comparison samples.

The invention claimed is:

1. A silicone rubber composition comprising silicone rubber and a fumed silica doped with potassium by means of aerosol, wherein the fumed silica filler is a low structure oxide which has been prepared pyrogenically by flame oxidation or by flame hydrolysis and which has a potassium content as $K_2O$ from 0.15 to 0.316 wt. %, the BET surface area of the doped oxide being from 10 to 1000 m$^2$/g and the DBP adsorption of the fumed oxide being undetectable or being less than 85% of the value for that fumed silica, if undoped, wherein the silicone rubber is liquid silicone rubber, and wherein the liquid silicone rubber exhibits markedly lower viscosities and markedly lower flow limits as compared with undoped fumed silicas of equal or similar surface area.

2. The silicone rubber according to claim 1, characterized in that the BET surface area of the doped oxide being from 107 to 324 m$^2$/g.

* * * * *